Patented Jan. 9, 1934

1,942,532

UNITED STATES PATENT OFFICE 1,942,532

LARVICIDE AND PROCESS OF MAKING THE SAME

John Clingman Munday, New York, N. Y.

No Drawing. Application May 26, 1931
Serial No. 540,212

3 Claims. (Cl. 167—14)

My invention relates to a larvicide particularly intended for use in mosquito infested districts and in the process of making the larvicide, and it consists in the product hereinafter claimed, and in the method of making it.

Larvicides such as Paris green, mixed with some inert substance such as hydrated lime, have been used on swamps or lakes in destroying Anopheline larvæ. It is sometimes deposited by airplanes, and it is also spread by boats equipped with proper dusting devices. The particles of Paris green remain floating for a time on the surface of the water, and are ingested by the surface-feeding Anopheles larvæ, to which Paris green is lethal.

The duration of toxicity, i. e., the period from the time of dusting to the appearance of a significant and sustained increase in larvæ when using hydrated lime as the diluent, is between two and three days. Different brands of Paris green are not equally effective, some brands causing practically no killing in the dusted area.

The reason for the short duration of this period is that the Paris green has high specific gravity, is soluble, and is easily wetted by water, so that it tends to sink in a relatively short time.

An object of my invention is to provide a larvicide which will float on water for an extended period, thereby greatly increasing its effectiveness.

A further object is to provide a product which is rendered water-proof, thereby preventing disintegration by solution.

A further object is to provide a process by means of which a larvicide such as Paris green, which ordinarily can only have limited time for its effectiveness, may be treated so as to greatly increase its floatability, and to render it water-proof.

A further object is to provide a process by means of which a larvicide such as some forms of Paris green, which are ineffective for the purpose of destroying larvæ, may be rendered highly efficient for this purpose at a relatively small cost.

A further object is to provide a process for producing a larvicide which is simple in that it requires no expensive apparatus, and which can be completed in a very short time, thus providing a process which can be carried out at a small cost.

Other objects and advantages will appear in the following specification, and the novel features of the invention will be particularly pointed out in the appended claims.

In carrying out my invention I may make use of any of a number of larvicides containing toxic constituents, such as Paris green. The examples given below are two of many within the scope of the present invention, and are cited for sake of illustration.

Example 1

10 pounds of Paris green.
1.5 ounces sodium amyl xanthate.
4 gallons of water.

The Paris green is shaken with the water solution of the sodium amyl xanthate. It is then filtered and dried in any suitable manner, and then screened through a 150 mesh sieve. This product is light green in color, and highly resistant to wetting.

Example 2

10 pounds of Paris green.
1.5 ounces Turkey red oil.
4 gallons of water.

In this case as in the example given above, the Paris green is agitated with the water and the Turkey red oil, and is filtered and dried.

The product dusted on water in a marsh or lake remains floating for a long time. In one instance it floated for ninety days on still water in the laboratory without an appreciable loss through sinking or solution. The treated Paris green is difficult to wet and the water upon which it is dusted remains colorless, indicating no solution of the green.

As an instance showing the effect on Paris green I would state that when untreated this effected practically no killing of larvæ in the dusted area, but after treatment with Turkey red oil it caused 100% mortality within a short space of time and kept the dusted area free of larvæ for five days. This seems to indicate that the differences in effectiveness of various brands such as those of Paris green are not due to differences in toxicity, but mainly and perhaps wholly to differences in floatability.

The mechanism of the removal of the reagent from solution is not impregnation or absorption, but adsorption. This adsorption has been shown in some cases to be the result of a surface reaction. For example, Paris green reacts with sodium amyl xanthate in aqueous solution. Arsenite ions are thrown into solution from the surface of the Paris green particles; amyl xanthate ions are removed from solution, while the concentration of sodium ions in solution remains unchanged. The copper ions remain on the Paris green particles, holding the amyl xanthate ions as copper amyl xanthate.

In the reaction explained above, the coating of the copper amyl xanthate gives each particle a water repelling property. This results from the oily nature of the amyl groups which are probably orientated out from the surface of the particle and which present a layer of oil which is water repellent.

In addition to Paris green I may make use of any of a number of substances such as copper arsenite, copper arsenate, copper aceto-arsenite, copper carbonate, lead arsenate, lead carbonate, mercuric arsenate, mercurous arsenate or Bordeaux mixture.

For increasing the floatability and waterproofing toxic agent I may also use such substances as fatty acids or benzenoid acids, such as capric acid, or their salts, such as sodium stearate, or their esters, such as benzyl acetate, organic compounds containing sulfur, such as sodium amyl xanthate or thiocresol or Turkey red oil, organic compounds containing nitrogen as an amino or substituted amino or diazo or nitro group, such as alpha-naphthylamine or diazo-amino-benzene or nitrobenzene, organic compounds containing phosphorus, such as aerofloat (an ester of thio phosphoric acid and cresol), organic compounds containing the alcohol or phenol group, such as cresol, and hydrocarbons, or, compounds which rearrange or decompose or oxidize or hydrolyze to give products of the aforementioned types.

Experimentation has shown that the waterproofing action can be effected by the following methods:

1. Agitation of the larvicide with a solution of the waterproofing agent, the solvent being water or a non-aqueous medium such as alcohol or benzene or other organic solvent.

2. Intimate mixing of the larvicide with the waterproofing agent, such as by grinding the two in a ball mill. Adsorption takes place in the absence of any solvent; this is evidenced by the color change that occurs when Paris green is intimately mixed with sodium amyl xanthate, the dark green color of the Paris green becoming a yellow green due to the formation of yellow copper zanthate on the surface of the Paris green particles. The proportions will vary somewhat with the properties of the waterproofing agent, as liquid waterproofing agents will probably be required in less amounts than solid reagents. I believe from 1 to 5% will cover all types, and suggest for the example; 10 pounds Paris green to 4 ounces of sodium amyl xanthate.

A slightly better product is obtained if a small amount of water or organic solvent is added before or after mixing as above; this assures more intimate contact and better adsorption takes place. The amount of solvent added does not seem to be important, either in this case or in (1); the mix may be gotten moist, or thoroughly wet, or enough solvent added to form a soup, the products having practically the same floatability.

It is important to note that waterproofing may be effected during the manufacture of the Paris green or larvicide. For example Paris green forms as a precipitate when copper sulfate and acetic acid, or basic acetate of copper, is added to a water solution, or dilute alkali solution, of arsenious acid; the waterproofing agent may be added immediately after the precipitation, before filtration (the acidity of the batch must be adjusted to neutrality or slight alkalinity before adding waterproofing agents such as xanthate which decompose in acid solution). The batch is agitated, and the Paris green filtered, ground and screened.

Or, the batch so treated may be filtered, and the filter-cake, still wet with the solution of the waterproofing agent, be ground in wet-grinding equipment.

A third method of waterproofing during manufacture consists of adding the waterproofing agent to the water used in washing the filter cake of the larvicide, which operation may be followed by wet or dry grinding of the product.

In the first two of these three methods of treatment during manufacture, an amount of waterproofing agent equal to 1% of the precipitated Paris green is added to the batch. This corresponds to 1.5 ounces Turkey red oil for 10 pounds Paris green. In the third method, that of washing the filter cake with a solution of the waterproofing agent, a 0.5 to 1% solution is satisfactory, although the strength of the solution may be varied considerably without having much effect on the floatability of the product.

I claim:

1. The herein described process of producing a larvicide which consists in agitating Paris green with a solution of sodium amyl xanthate, filtering out the solution, drying the treated powder, and sifting the latter.

2. The herein described process of producing a larvicide which consists in agitating a toxic inorganic salt with a solution of adsorption agent, at ordinary temperature, capable of rendering the salt waterproof and buoyant.

3. A larvicide consisting of a toxic inorganic salt having an oleaginous agent adsorbed thereon to render said larvicide waterproof and buoyant.

JOHN CLINGMAN MUNDAY.